P. STEWART.
HORSE DETACHER.
APPLICATION FILED MAR. 22, 1918.
1,354,067. Patented Sept. 28, 1920.
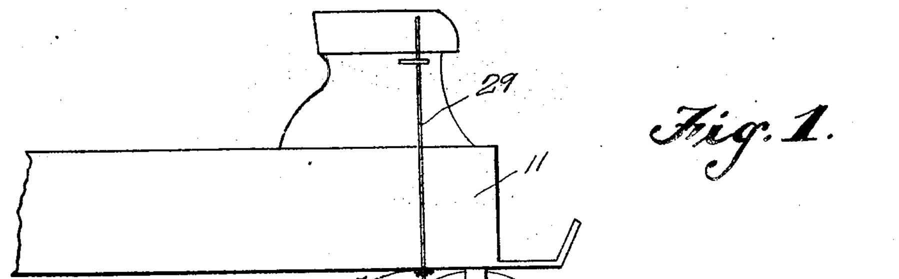
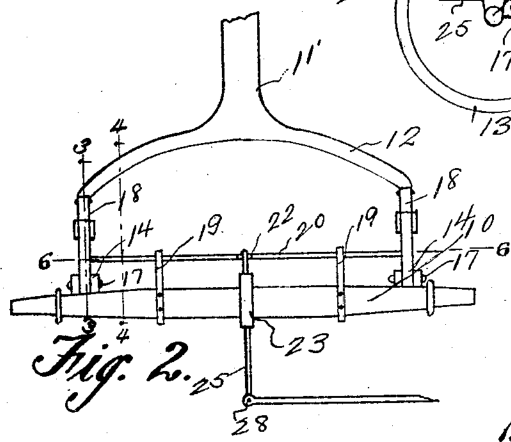
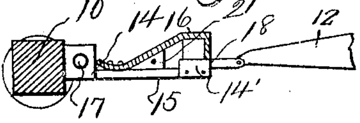
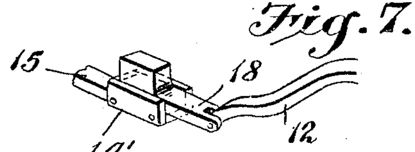
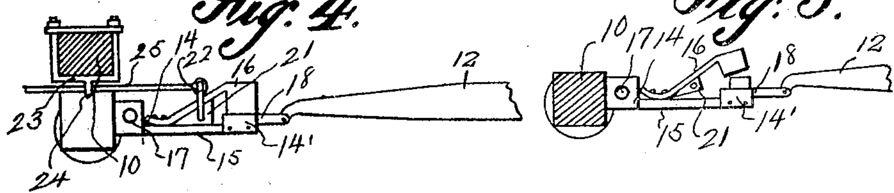
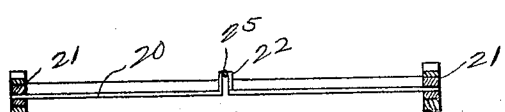
Inventor
P. Stewart
Witnesses
[signatures]
By [signature] Attorneys

UNITED STATES PATENT OFFICE.

PAUL STEWART, OF BROCKSBURG, NEBRASKA.

HORSE-DETACHER.

1,354,067. Specification of Letters Patent. Patented Sept. 28, 1920.

Application filed March 22, 1918. Serial No. 224,023.

*To all whom it may concern:*

Be it known that I, PAUL STEWART, a citizen of the United States, residing at Brocksburg, in the county of Keyapaha, State of Nebraska, have invented certain new and useful Improvements in Horse-Detachers; and I do hereby declare the following to be a full, clear, and exact description of the invention, such as will enable others skilled in the art to which it appertains to make and use the same.

This invention relates to new and useful improvements in horse detachers.

One object of the present invention is to provide a novel and improved structure of this character whereby the horse, together with the shafts or pole, when two horses are used, may be more readily and easily as well as safely released from the carriage or wagon, when the animal or animals become frightened and attempt to run away.

Another object is to provide a novel and improved device of this character which can be easily applied to carriages or wagons and their shafts or poles which are now in use.

Other objects and advantages will be apparent from the following description when taken in connection with the accompanying drawing.

In the drawing:

Figure 1 is a side elevation of a portion of a wagon showing my invention applied thereto.

Fig. 2 is a top plan view of the same.

Fig. 3 is a vertical longitudinal sectional view taken on the line 3—3 of Fig. 2.

Fig. 4 is a vertical longitudinal sectional view taken on the line 4—4 of Fig. 2.

Fig. 5 is a sectional view on the same line as that of Fig. 4, but showing the device in released position.

Fig. 6 is a vertical transverse sectional view taken on the line 6—6 of Fig. 2.

Fig. 7 is a perspective view of part of the connection shown in Fig. 5.

Referring particularly to the accompanying drawing, 10 represents the front axle of the wagon 11, 11′ the draft pole or tongue, and 12 the rear arched member of the tongue. Secured to the axle, adjacent each end, and inwardly of the wheels 13, is a forwardly extending member 14, which is formed with a forwardly extending portion 15. Secured to the upper end of the portion 15 and extending upwardly and forwardly therefrom, is a flexible arm 16. The forward end of the arm 16 is provided with a downwardly extending socket portion 16′. The portions of the members 14 which are connected to the axle are attached in the usual manner with the ordinary pivoted thill coupling 17. To the ends of the arcuate member 12 are secured the rearwardly extending rectangular members 18 which are adapted to be received between the portions 15 and 16 of the members 14. It will be noted that the members 14 are formed with the side portions 14′ which prevent sidewise movement of the members 18 on said members 14, when properly connected. Extending in parallel relation to, and in front of the axle, and supported rotatably in brackets 19, carried by the front axle 10, is a shaft 20. The ends of the said shaft are provided with transverse heads 21 which lie between the portions 16 and the upper faces of the members 15, whereby when said shaft is turned, as will be later referred to, the heads will flex the arms 16 upwardly and permit the members 18 to slide from thereunder. In the intermediate portion of the shaft 20 there is formed a crank member 22.

Secured to and depending from the center of the axle is a clip 23, the center of the lower portion of which is formed with an eye 24 through which is slidably disposed a rod 25, the forward end of said rod being pivotally connected to the crank member 22, while the rear end is connected to the arm 26 of the shaft 27, by a knuckle joint 28. This shaft 27 is mounted on the forward portion of the box of the wagon, and extends to one side thereof where it is provided with a vertical hand lever 29, arranged within convenient reach of the driver from the seat.

It will thus be seen that when the draft animals become frightened and run away, the driver simply moves the lever 29 which results in the rotation of the shaft 20, and the upwardly flexing of the arms 16, thus releasing the members 18 therefrom. The animals can then run away without the wagon, the pole or shafts remaining attached to them by the harness, except the portions which are pivotally connected to the axle.

What is claimed is:

A horse detacher including members carried by the rear portions of the draft pole of the vehicle and having upwardly extending angular lugs, members pivotally connected to the axle of the vehicle and having gripping arms one of which is flexible and formed with terminal socket portions for receiving and holding the lugs of the pole means, a transverse shaft carried by the vehicle and having angular heads on the ends thereof disposed between the gripping arms, and means for rotating said shaft whereby the said heads will engage and flex the said flexible gripping arms out of engagement with the lugs of the pole means.

In testimony whereof, I affix my signature, in the presence of two witnesses.

PAUL STEWART.

Witnesses:
FRED WISEMILLER,
S. H. ASHBY.